United States Patent
Liu et al.

(10) Patent No.: US 8,854,008 B2
(45) Date of Patent: Oct. 7, 2014

(54) COMBINED PI FEEDBACK AND FEEDFORWARD CELL BALANCING METHOD

(75) Inventors: Wei Liu, Warren, MI (US); John T. Guerin, Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 374 days.

(21) Appl. No.: 13/315,179

(22) Filed: Dec. 8, 2011

(65) Prior Publication Data

US 2013/0147438 A1    Jun. 13, 2013

(51) Int. Cl.
*H02J 7/00*    (2006.01)
(52) U.S. Cl.
USPC ............................. 320/134; 320/116; 320/132
(58) Field of Classification Search
USPC ........... 320/134, 132, 116; 701/22; 180/65.29
See application file for complete search history.

(56) References Cited

U.S. PATENT DOCUMENTS

| | | | | |
|---|---|---|---|---|
| 7,091,700 B2 * | 8/2006 | Kadouchi et al. | ............. | 320/132 |
| 7,193,391 B2 * | 3/2007 | Moore | ............. | 320/116 |
| 7,489,106 B1 * | 2/2009 | Tikhonov | ............. | 320/116 |
| 7,969,039 B2 * | 6/2011 | Mimatsu et al. | ............. | 307/9.1 |
| 8,330,424 B2 * | 12/2012 | Kim | ............. | 320/136 |
| 8,461,806 B2 * | 6/2013 | Lupu et al. | ............. | 320/122 |
| 2011/0012558 A1 | 1/2011 | Schaffnit | | |
| 2012/0319652 A1 * | 12/2012 | Namou et al. | ............. | 320/116 |

FOREIGN PATENT DOCUMENTS

CN    102019927 A    4/2011

OTHER PUBLICATIONS

Guerin J. T. et al, "Cell Balancing Algorithm Verification Through a Simulation Model for Lithium Ion Energy Storage Systems" 2010-1-7079 Paper Published Apr. 12, 2010 ISSN 0148-7191, 11 pgs.

* cited by examiner

*Primary Examiner* — M'Baye Diao
(74) *Attorney, Agent, or Firm* — John A. Miller; Miller IP Group, PLC

(57) ABSTRACT

A method and system for battery pack cell state of charge balancing using a proportional-integral feedback control combined with a feedforward control. The proportional-integral feedback control acts on the difference between the average discharge for all cells over a previous driving cycle and the discharge of a specific cell over the previous driving cycle. Thus, the feedback term is based on whether an individual cell discharges more quickly or less quickly than the battery pack average during driving. A cell which discharges more quickly will receive decreased resistive discharge balancing. The feedforward control acts on the difference between an individual cell's state of charge and the battery pack average state of charge at the beginning of a current driving cycle. The overall control effort, which determines the resistive discharge balancing on-time duty cycle for each cell, is the sum of the feedback control signal and the feedforward control signal.

20 Claims, 4 Drawing Sheets

COMBINED PI FEEDBACK AND FEEDFORWARD CELL BALANCING METHOD

BACKGROUND OF THE INVENTION

1. Field of the Invention

This invention relates generally to battery pack cell balancing and, more particularly, to a method and system for balancing the state of charge of cells in a battery pack which uses both feedback and feedforward controls, and which takes into account state of charge differences caused by both self-discharge rate deviations between cells and capacity deviations between cells, as well as deviations of parasitic load of electronic measurement/control system.

2. Discussion of the Related Art

Electric vehicles and gasoline-electric or diesel-electric hybrid vehicles are rapidly gaining popularity in today's automotive marketplace. Electric and hybrid electric vehicles offer several desirable features, such as reducing or eliminating emissions and petroleum-based fuel consumption at the consumer level, and potentially lower operating costs. A key component/subsystem of electric and hybrid electric vehicles is the battery pack, which can represent a substantial proportion of the vehicle's cost. Battery packs in these vehicles typically consist of numerous interconnected cells, which are able to deliver a lot of power on demand. Maximizing battery pack performance and life are key considerations in the design and operation of electric and hybrid electric vehicles.

In a battery pack consisting of hundreds of cells, there is inevitably some variation in the performance of individual cells, and this variation increases as a battery pack ages. For example, if all cells in a battery pack are fully charged and the battery pack is then used to power a vehicle, some cells will discharge slightly faster than others, due to internal resistance and self-discharge rate deviations. Energy storage capacity may also vary from cell to cell. In order to maximize battery pack durability and driving range of the vehicle, it is important to minimize the variations in state of charge from cell to cell. A common method of balancing state of charge between cells in a battery pack is to selectively discharge higher state of charge cells through a resistor. The amount of resistive discharging of each cell is typically determined as a function of the cell's state of charge relative to the average state of charge of all cells in the battery pack.

While the current cell balancing method described above is somewhat effective in balancing state of charge between cells in a battery pack, it does not take cell capacity deviation into account. That is, a cell with a lower energy storage capacity may have a higher state of charge at the beginning of a driving cycle because that cell charged at a faster rate than other cells in the battery pack. If it is a lower capacity that causes a cell to have a higher state of charge at the beginning of a driving cycle, that cell may naturally balance state of charge with the rest of the battery pack during the driving cycle, and resistively discharging that cell may over-compensate and cause the cell to discharge too quickly.

There is a need for a battery pack cell state of charge balancing method which takes into account both self-discharge rate and energy storage capacity deviations between cells. Such a method could improve cell state of charge balancing performance and minimize unnecessary resistive discharging along with the associated battery pack aging, thus leading to increased customer satisfaction through improved battery pack life and increased vehicle driving range.

SUMMARY OF THE INVENTION

In accordance with the teachings of the present invention, a method and system are disclosed for battery pack cell state of charge balancing using a proportional-integral feedback control combined with a feedforward control. The proportional-integral feedback control acts on an error signal which is the difference between the average amount of discharge for all cells over the previous driving cycle and the amount of discharge for a specific cell over the previous driving cycle. Thus, the feedback term is based on whether an individual cell discharges more quickly or less quickly than the battery pack average during driving, where a cell which discharges more quickly will receive decreased resistive discharging. The feedforward control acts on the difference between an individual cell's state of charge at the beginning of a driving cycle and the battery pack average state of charge at the beginning of the driving cycle. The overall control effort, which determines the resistive balancing on-time duty cycle for each cell, is the sum of the proportional-integral feedback control signal and the feedforward control signal.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a combined proportional-integral feedback and feedforward cell state of charge balancing method is merely exemplary in nature, and is in no way intended to limit the invention or its applications or uses. For example, the discussion that follows is directed to cell state of charge balancing in electric vehicle battery packs, but the method is equally applicable to battery packs in other vehicular and non-vehicular applications.

Battery packs in electric vehicles and gasoline-electric or diesel-electric hybrid vehicles (hereinafter collectively referred to simply as "electric vehicles") typically consist of hundreds of individual cells. Lithium-ion is a popular rechargeable battery chemistry, and each lithium-ion cell produces approximately 3-4 volts, depending on state of charge. Many cells connected serially in a module can provide the high voltage necessary to drive electric vehicle motors. Multiple modules connected in parallel deliver the energy capacity to provide a useful driving range for the electric vehicle.

In order to maximize both vehicle driving range and longevity of the battery pack, it is important to balance the state of charge of individual cells in a battery pack, so that all cells are within a small state of charge band. State of charge balancing is typically done by resistively discharging individual cells which have a higher state of charge, in order to drop the state of charge of those cells closer to the battery pack average. A conventional control strategy is to determine the state of charge of each cell in the battery pack at "key-up" (when a vehicle is turned on at the beginning of a driving cycle), and establish the resistive discharge duty cycle for each cell based on this initial state of charge. Specifically, the higher a cell's initial state of charge is above the battery pack average state of charge, the longer the on-time duty cycle of the resistive discharge for that cell. This conventional control strategy simply functions to drain higher state of charge cells faster, in an attempt to bring them back to the mean.

Figure 1:
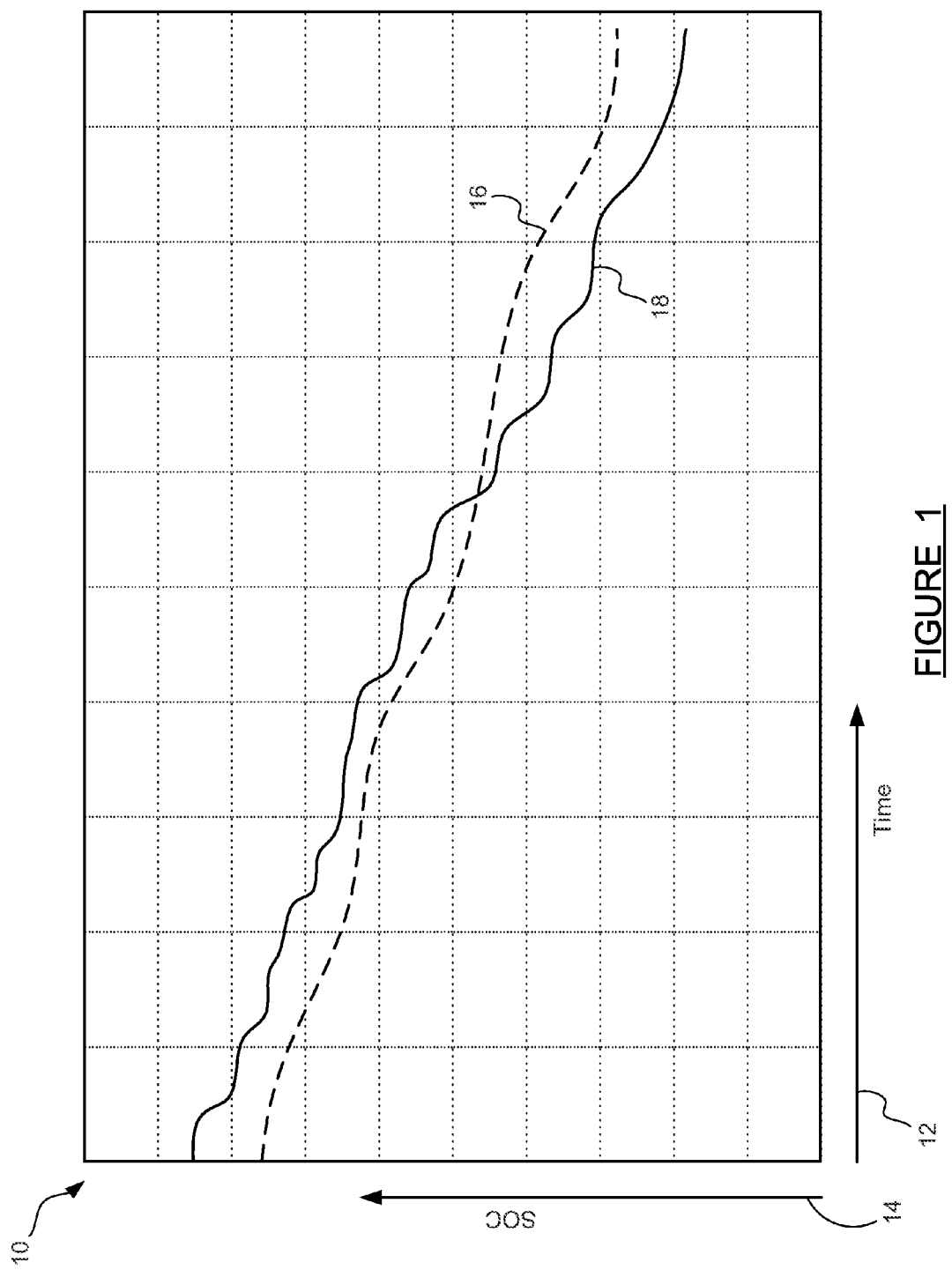
FIG. 1 is a graph showing an individual cell's state of charge and a battery pack average state of charge during a driving cycle, where traditional controls are used for resistive state of charge balancing.

FIG. 1 is a graph 10 showing the state of charge of an individual cell, and the overall average state of charge of all cells in a battery pack, over the course of a driving cycle of an electric vehicle. The graph 10 shows what can happen to an individual cell's state of charge using the conventional balancing control strategy described above. In the graph 10, horizontal axis 12 represents time, and vertical axis 14 represents state of charge. The horizontal axis 12 runs from a time of zero seconds to a time at the end of the driving cycle which may typically be in the range of a half hour (1800 seconds) to an hour (3600 seconds), more or less. The vertical axis 14 shows state of charge from zero percent to 100 percent.

Curve 16 represents the average or mean state of charge for all cells in the battery pack. Curve 18 represents the state of charge of an individual cell in the battery pack. It can be seen from the curve 16 that the mean state of charge begins at a fairly high level, close to 80%. The curve 18 shows that the individual cell has a higher state of charge at key-up, approximately 85%. As the vehicle goes through its driving cycle, the mean state of charge drops as expected, as shown by the curve 16. The individual cell state of charge also drops, as shown by the curve 18. However, because the individual cell's state of charge was higher than the mean at key-up, the individual cell is being resistively discharged in addition to providing power to the vehicle; thus, its rate of discharge is faster than the mean.

As discussed above, the amount of resistive discharging is intended to bring an individual cell's state of charge back to the mean over the course of an average driving cycle. However, if the individual cell had a higher initial state of charge because it had a lower energy storage capacity (and thus took a charge faster during charging), then the resistive discharge calculated at key-up will over-compensate and cause the cell's state of charge to drop well below the mean over the course of the driving cycle. This phenomenon can be seen on the graph 10. Consider that the average cell in the battery pack has a capacity of 45 amp-hours, and the individual cell represented by the curve 18 has a capacity 10% lower than the mean, or 40.5 amp-hours. The conventional state of charge balancing control strategy described above, which does not take into account the energy storage capacity of cells, causes the individual cell represented by the curve 18 to drop well below the mean over the course of the driving cycle. This pattern, where some individual cells in a battery pack are more highly charged and more highly discharged than the mean on each cycle, due to a lower energy storage capacity, is detrimental to the longevity and performance of those cells.

Figure 2:
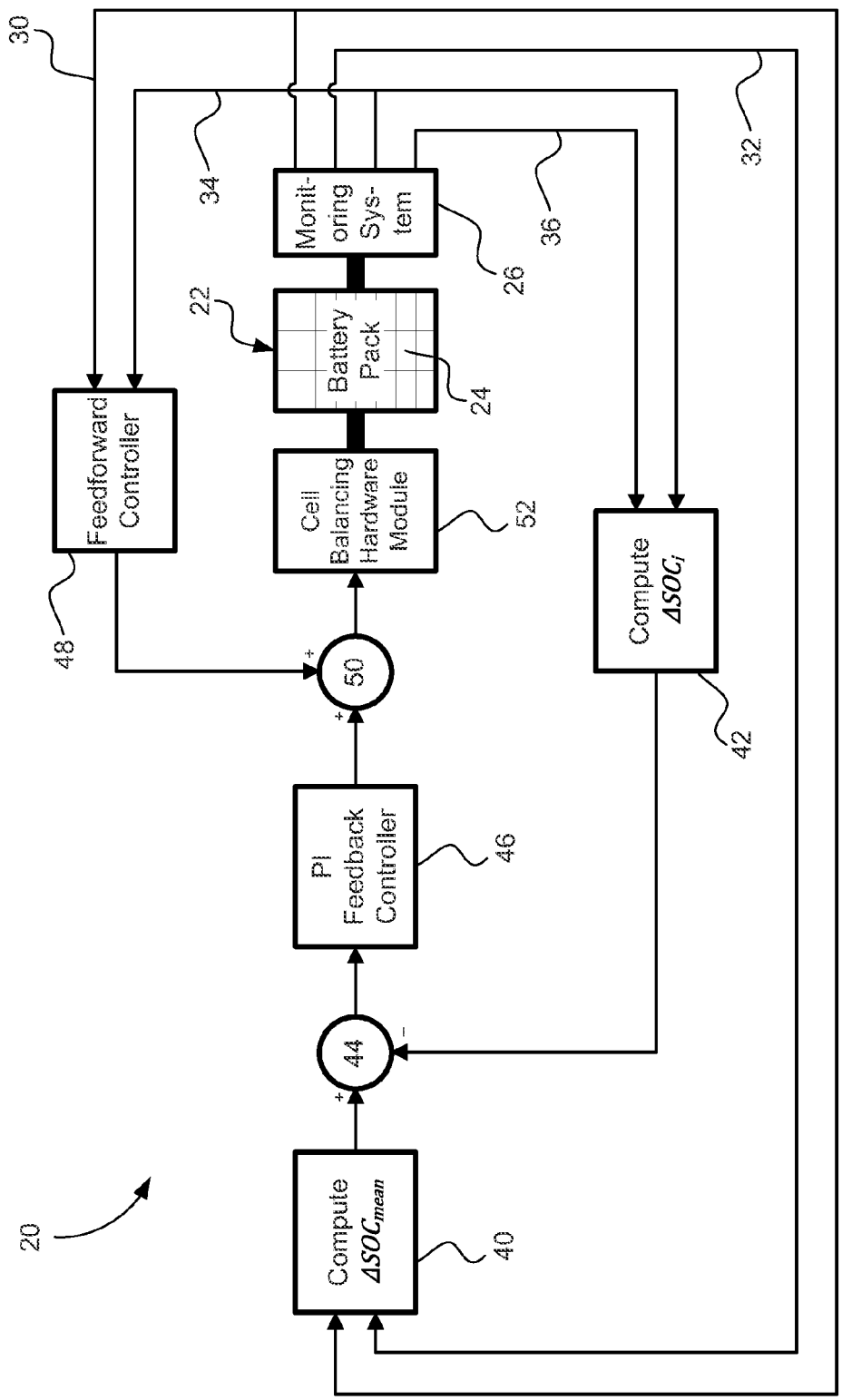
FIG. 2 is a block diagram of a state of charge balancing system using proportional-integral feedback control combined with feedforward control.

FIG. 2 is a block diagram of a state of charge balancing system 20 which overcomes the limitations of the conventional state of charge balancing control strategy described previously. The system 20 takes into account not only the state of charge of each individual cell at start-up, but also the energy storage capacity of each cell, and determines a resistive discharge duty cycle which does a better job of bringing each cell's state of charge back to the mean over the course of a driving or discharge cycle.

A battery pack 22 consists of numerous individual cells 24, as discussed previously. A monitoring system 26, which may be integrated with or in electronic communication with the battery pack 22, determines state of charge of each cell 24 in the battery pack 22. Although not directly measurable, state of charge of each cell 24 can be determined as a function of two properties which can be measured; the temperature of the cell 24 and the open-circuit (no load) voltage of the cell 24. Typically, temperature and open-circuit voltage are measured and a look-up table is used to determine state of charge for each battery cell 24, using values that are known for cells of a certain construction. This measurement and look-up activity is performed by the monitoring system 26 for each cell 24 in the battery pack 22.

Four different parameters are provided as output from the monitoring system 26: mean state of charge for all cells 24 in the battery pack 22 for the current key cycle, on line 30; mean state of charge for all cells 24 in the battery pack 22 for the previous key cycle, on line 32; state of charge for each individual cell i for the current key cycle, on line 34; and state of charge for each individual cell i for the previous key cycle, on line 36. The term "key cycle" describes a key-up or power-up of the electric vehicle. That is, the current key cycle is the key-up of the vehicle that has just occurred, in preparation for the vehicle to be driven on the current driving trip. The previous key cycle was the key-up of the vehicle for the previous driving trip, which may have occurred less than an hour earlier, several days earlier, or anywhere in between.

At block 40, a value $\Delta SOC_{mean}$ is computed as the difference between the mean state of charge for all cells 24 in the battery pack 22 for the current key cycle (on the line 30) and the mean state of charge for all cells 24 in the battery pack 22 for the previous key cycle (on the line 32). That is, at the block 40, the value on the line 32 is subtracted from the value on the line 30. The value $\Delta SOC_{mean}$ computed at the block 40 indicates how much the average state of charge for all cells 24 in the battery pack 22 dropped during the previous driving cycle.

At block 42, a value $\Delta SOC_i$ is computed for each individual cell i as the difference between the state of charge for each individual cell i for the current key cycle (on the line 34) and the state of charge for each individual cell i for the previous key cycle (on the line 36). That is, at the block 42, the value on the line 36 is subtracted from the value on the line 34, for each individual cell i. The value $\Delta SOC_i$ computed at the block 42 indicates how much the state of charge for each individual cell i in the battery pack 22 dropped during the previous driving cycle.

At summing junction 44, the value $\Delta SOC_i$ from the block 42 is subtracted from the value $\Delta SOC_{mean}$ from the block 40. Thus, the signal provided as output from the summing junction 44 designates how much more or less than the mean each individual cell i was discharged over the previous driving cycle. This signal can be considered an error signal to be used by a proportional-integral controller 46. The proportional-integral controller 46 determines a feedback control effort using standard proportional-integral control strategy. As would be understood by one skilled in the art, a proportional-integral controller computes both a proportional term, which is proportional to the error signal from the summing junction 44, and an integral term, which is proportional to the integral of the error signal from the summing junction 44.

The blocks 40 and 42 and the summing junction 44 are shown for clarity in describing the control strategy used in the state of charge balancing system 20. However, in practice, the blocks 40 and 42 and the summing junction 44 could be consolidated with the proportional-integral controller 46; in this case the proportional-integral controller 46 could receive the signals on the lines 30, 32, 34 and 36 and directly compute the feedback control effort for each individual cell i.

At block 48, a feedforward control effort is computed for each individual cell i as the difference between the mean state of charge for each individual cell i for the current key cycle (on the line 34) and the state of charge for all cells 24 in the battery pack 22 for the current key cycle (on the line 30). Thus, the feedforward control effort computed at the block 48 implements the traditional cell balancing control strategy described previously, where higher state of charge cells receive more resistive discharging than other cells.

At summing junction 50, the feedback control effort from the proportional-integral controller 46 is combined with the feedforward control effort from the block 48. The output of the summing junction 50 represents the overall control effort for each individual cell i—where the control effort is expressed in terms of an on-time percentage for resistive discharging. The output of the summing junction 50 is provided to a cell balancing hardware module 52, which is connected to the battery pack 22 and performs resistive discharge state of charge balancing on each individual cell i. The resistance of the discharging resistor used in the cell balancing hardware module 52 is fixed. Therefore, an on-off duty cycle is used to vary the amount of resistive discharging applied to each individual cell i—where the on-time percentage for the on-off duty cycle is provided from the summing junction 50.

The state of charge balancing system 20 thus comprehends not only whether each individual cell i has a state of charge higher than the mean (via the feedforward control effort at the block 48), but also the energy storage capacity of each individual cell i (via the feedback control effort from the proportional-integral controller 46).

Figure 3:
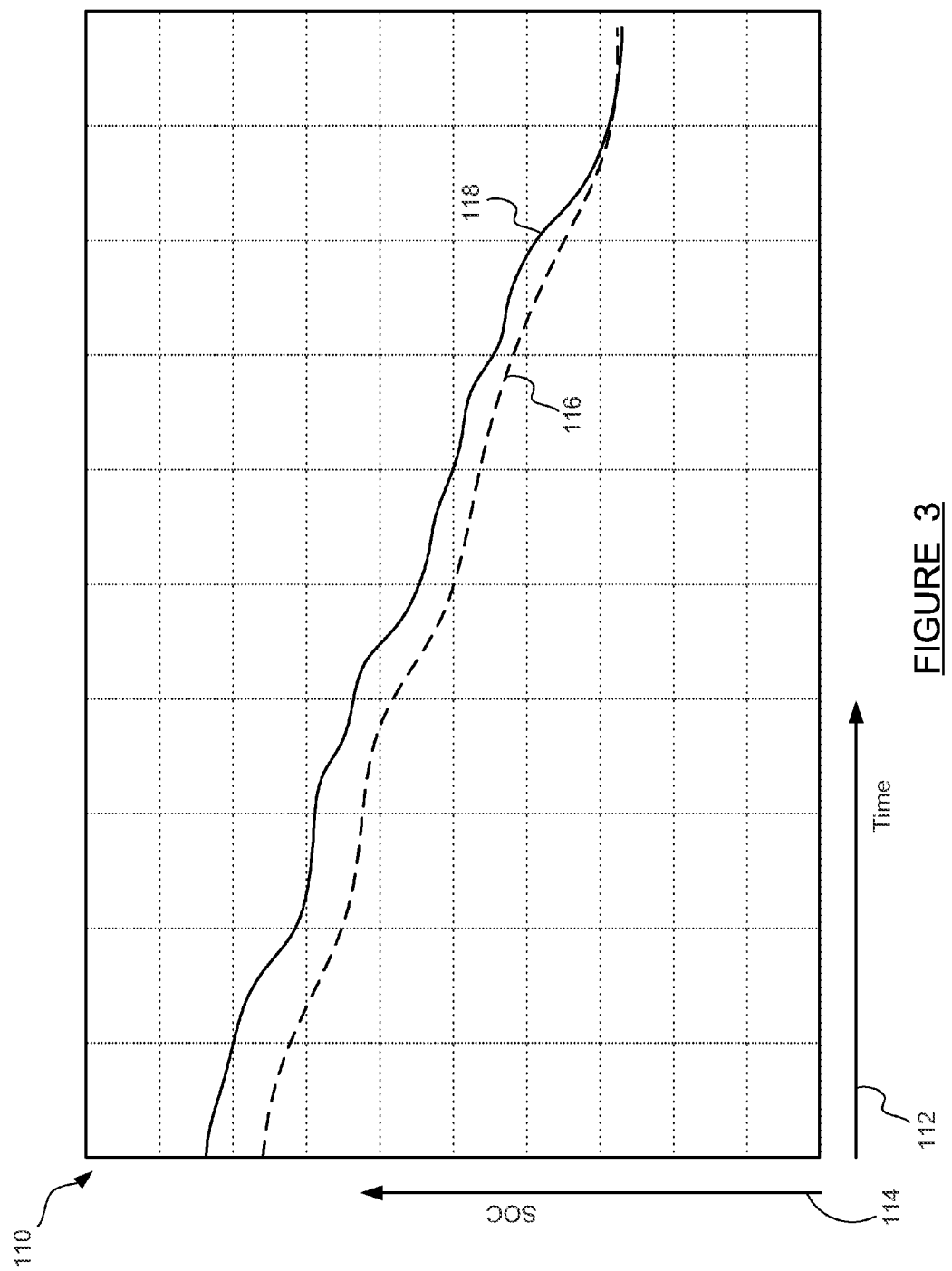
FIG. 3 is a graph showing an individual cell's state of charge and a battery pack average state of charge during a driving cycle, where the combined proportional-integral feedback and feedforward state of charge balancing controller of FIG. 2 is used.

FIG. 3 is a graph 110 showing the state of charge of an individual cell i, and the overall average state of charge of all of the cells 24 in the battery pack 22, over the course of a driving cycle of an electric vehicle. The graph 110 shows how the state of charge balancing system 20, described above, can improve state of charge balancing performance. In the graph 110, horizontal axis 112 represents time, and vertical axis 114 represents state of charge. The graph 110 is similar to the graph 10 of FIG. 1 in all respects except one; that is, on the graph 110, the individual cell state of charge converges to the mean cell state of charge rather than overshooting and becoming excessively discharged. This is discussed further below.

Curve 116 represents the average or mean state of charge for all of the cells 24 in the battery pack 22. Curve 118 represents the state of charge of an individual cell i in the battery pack 22. It can be seen from the curve 116 that the mean state of charge begins at a fairly high level, close to 80%. The curve 118 shows that the individual cell i has a higher state of charge at key-up, approximately 85%. As the vehicle goes through its driving cycle, the mean state of charge drops as expected, as shown by the curve 116. The individual cell state of charge also drops, as shown by the curve 118. However, as discussed above, the individual cell i may have a lower energy storage capacity; thus, its rate of discharge is faster than the mean even without resistive discharging. Using the cell state of charge balancing system 20 of FIG. 2, the reduced energy storage capacity of the individual cell i can be taken into account. This dictates less, if any, resistive discharging be applied to the individual cell i, and the result is that the state of charge of the individual cell i converges to the mean over the course of the driving cycle, rather than overshooting as seen on the graph 10 of FIG. 1.

Figure 4:
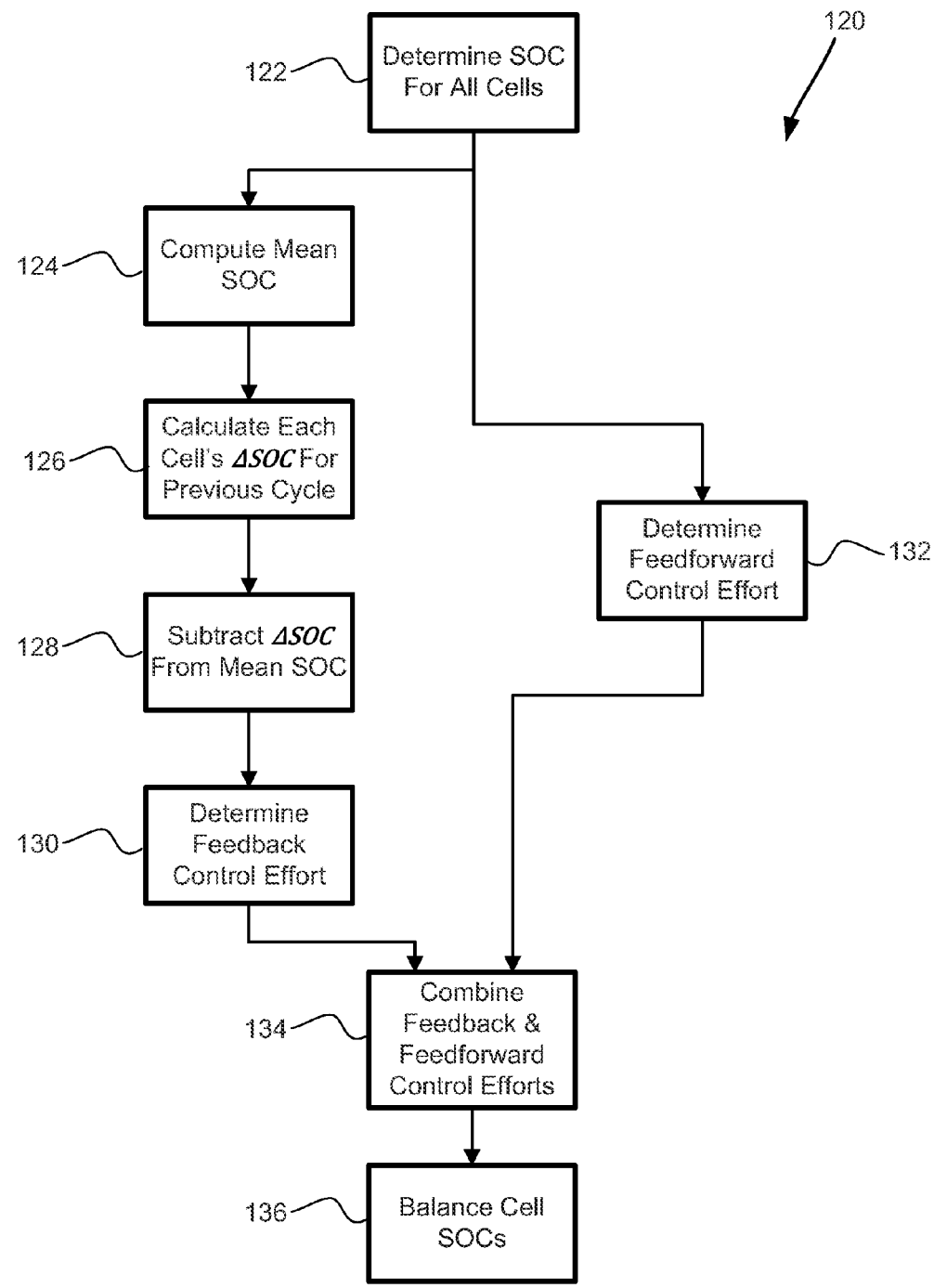
FIG. 4 is a flowchart diagram of a method for balancing state of charge for cells in a battery pack using proportional-integral feedback control combined with feedforward control.

FIG. 4 is a flow chart diagram 120 of a method for balancing the state of charge of cells in a battery pack using both proportional-integral feedback control and feedforward control. At box 122, the state of charge for each individual cell i in the battery pack 22 is determined at key-up of the vehicle (or power-up of any appliance using the battery pack 22). As discussed previously, the state of charge for each individual cell i and the mean state of charge for all of the cells 24 in the battery pack 22 must be provided for the current key-up cycle and the previous key-up cycle, in order to enable the disclosed control method.

At box 124, a value $\Delta SOC_{mean}$ is computed as the difference between the mean state of charge for all of the cells 24 in the battery pack 22 for the current key cycle and the mean state of charge for all of the cells 24 in the battery pack 22 for the previous key cycle. At box 126, a value $\Delta SOC_i$ is computed for each individual cell i as the difference between the state of charge for each individual cell i for the current key cycle and the state of charge for each individual cell i for the previous key cycle. At box 128, the value $\Delta SOC_i$ from the box 126 is subtracted from the value $\Delta SOC_{mean}$ from the box 124. Thus, the output from the box 128 designates how much more or less than the mean each individual cell i was discharged over the previous driving cycle. This value can be used to determine a feedback control effort for each individual cell i at box 130. The feedback control effort at the box 130 is determined using standard proportional-integral control logic.

As discussed previously in regards to the elements 40-46 in the state of charge balancing system 20, the process steps of the boxes 124-130 could be combined to directly compute the feedback control effort for each individual cell i at the box 130, using the input data from the boxes 124 and 126.

At box 132, a feedforward control effort is computed for each individual cell i as the difference between the state of charge for each individual cell i for the current key cycle and the mean state of charge for all of the cells 24 in the battery pack 22 for the current key cycle. At box 134, the feedback control effort from the proportional-integral control calculation at the box 130 is combined with the feedforward control effort from the box 132. The output of the box 134 is an overall control effort for each individual cell i, expressed as a duty cycle on-time percentage, and is used by the cell balancing hardware module 52 at box 136.

The combined proportional-integral feedback and feedforward control method disclosed herein provides improved cell state of charge balancing in multi-cell battery packs. It does so by virtue of accounting for both current cell state of charge and cell energy storage capacity, and using both factors in determining how much resistive discharging to apply to each cell. By avoiding over-applying resistive discharging to some cells, more energy is available for driving the vehicle, and long-term durability of the battery pack is improved. The resultant improved vehicle driving range and improved product durability both increase customer satisfaction, which in turn leads to more sales for the vehicle manufacturer.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A state of charge balancing system for a battery pack, said state of charge balancing system comprising:

a monitoring module for collecting state of charge data for each cell in the battery pack, said monitoring module providing signals representing a state of charge of each cell in the battery pack and a mean state of charge for all cells in the battery pack, for a current power-up and a previous power-up;

a feedback control module responsive to the signals from the monitoring module, said feedback control module being configured to compute a feedback control effort for each cell in the battery pack, where the feedback control effort accounts for an energy storage capacity of each cell in the battery pack;

a feedforward control module responsive to the signals from the monitoring module, said feedforward control module being configured to compute a feedforward control effort for each cell in the battery pack, where the feedforward control effort accounts for a relative state of charge of each cell in the battery pack; and a cell balancing hardware module responsive to signals from the feedback control module and the feedforward control module, where said cell balancing hardware module uses a sum of the feedback control effort and the feedforward control effort to balance the state of charge of each cell in the battery pack.

2. The state of charge balancing system of claim 1 wherein the monitoring module measures a temperature of each cell in the battery pack and an open circuit voltage of each cell in the battery pack, and uses the temperature and the open circuit voltage to determine the state of charge of each cell in the battery pack at each power-up.

3. The state of charge balancing system of claim 1 wherein the feedback control module uses a proportional-integral control routine to compute the feedback control effort.

4. The state of charge balancing system of claim 3 wherein the proportional-integral control routine operates on a difference between a $\Delta SOC_{mean}$ value and a $\Delta SOC_i$ value, where the $\Delta SOC_{mean}$ value difference between the mean state of charge for all cells in the battery pack at the current power-up and the mean state of charge for all cells in the battery pack at the previous power-up, and the $\Delta SOC_i$ value is a difference between the state of charge of each cell in the battery pack at the current power-up and the state of charge of each cell in the battery pack at the previous power-up.

5. The state of charge balancing system of claim 1 wherein the feedforward control module computes a function of a difference between the state of charge of each cell in the battery pack at the current power-up and the mean state of charge for all cells in the battery pack at the current power-up.

6. The state of charge balancing system of claim 1 wherein the cell balancing hardware module uses resistive discharging to balance the state of charge of each cell in the battery pack.

7. The state of charge balancing system of claim 6 wherein the resistive discharging is applied in an on-off duty cycle with an on-time percentage based on the sum of the feedback control effort and the feedforward control effort.

8. The state of charge balancing system of claim 1 wherein the battery pack is used in an electric vehicle.

9. A battery pack system with state of charge balancing, said battery pack system comprising:

a battery pack comprising a plurality of individual cells;

a monitoring module for collecting state of charge data for each cell in the battery pack, said monitoring module being in communication with the battery pack, said monitoring module providing signals representing a state of charge of each cell in the battery pack and a mean state of charge for all cells in the battery pack, for a current power-up and a previous power-up;

a feedback control module responsive to the signals from the monitoring module, said feedback control module being configured to compute a feedback control effort for each cell in the battery pack, where the feedback control effort accounts for an energy storage capacity of each cell in the battery pack;

a feedforward control module responsive to the signals from the monitoring module, said feedforward control module being configured to compute a feedforward control effort for each cell in the battery pack, where the feedforward control effort accounts for a relative state of charge of each cell in the battery pack; and a cell balancing hardware module responsive to signals from the feedback control module and the feedforward control module, said cell balancing hardware module being in communication with the battery pack, where said cell balancing hardware module uses a sum of the feedback control effort and the feedforward control effort to balance the state of charge of each cell in the battery pack.

10. The battery pack system of claim 9 wherein the monitoring module measures a temperature of each cell in the battery pack and an open circuit voltage of each cell in the battery pack, and uses the temperature and the open circuit voltage to determine the state of charge of each cell in the battery pack at each power-up.

11. The battery pack system of claim 9 wherein the feedback control module uses a proportional-integral control routine which operates on a difference between a $\Delta SOC_{mean}$ value and a $\Delta SOC_i$ value, where the $\Delta SOC_{mean}$ value is a difference between the mean state of charge for all cells in the battery pack at the current power-up and the mean state of charge for all cells in the battery pack at the previous power-up, and the $\Delta SOC_i$ value is a difference between the state of charge of each cell in the battery pack at the current power-up and the state of charge of each cell in the battery pack at the previous power-up.

12. The battery pack system of claim 9 wherein the feedforward control module computes a function of a difference between the state of charge of each cell in the battery pack at the current power-up and the mean state of charge for all cells in the battery pack at the current power-up.

13. The battery pack system of claim 9 wherein the cell balancing hardware module uses resistive discharging to balance the state of charge of each cell in the battery pack and the resistive discharging is applied in an on-off duty cycle with an on-time percentage based on the sum of the feedback control effort and the feedforward control effort.

14. A method for balancing state of charge of cells in a battery pack used to power an appliance, said method comprising:

collecting state of charge data comprising a state of charge of each cell in the battery pack at each power-up of the appliance;

computing a feedback control effort for each cell in the battery pack, where the feedback control effort is computed using the state of charge data and accounts for an energy storage capacity of each cell in the battery pack;

computing a feedforward control effort for each cell in the battery pack, where the feedforward control effort is computed using the state of charge data and accounts for a relative state of charge of each cell in the battery pack;

combining the feedback control effort and the feedforward control effort to determine an overall control effort for each cell in the battery pack; and using the overall control effort in a cell balancing module to balance the state of charge of each cell in the battery pack.

15. The method of claim 14 wherein computing a feedback control effort includes using a proportional-integral controller.

16. The method of claim 15 wherein the proportional-integral controller operates on a difference between a $\Delta SOC_{mean}$ value and a $\Delta SOC_i$ value, where the $\Delta SOC_{mean}$ value is a difference between a mean state of charge for all cells in the battery pack at a current power-up and the mean state of charge for all cells in the battery pack at a previous power-up, and the $\Delta SOC_i$ value is a difference between the state of charge of each cell in the battery pack at the current power-up and the state of charge of each cell in the battery pack at the previous power-up.

17. The method of claim 14 wherein computing a feedforward control effort includes computing a function of a difference between the state of charge of each cell in the battery pack at a current power-up and a mean state of charge for all cells in the battery pack at the current power-up.

18. The method of claim 14 wherein the overall control effort for each cell in the battery pack is expressed as an on-time percentage for an on-off duty cycle.

19. The method of claim 14 wherein the cell balancing module uses resistive discharging to balance the state of charge of each cell in the battery pack.

20. The method of claim 14 wherein the appliance is an electric vehicle.

* * * * *